(12) United States Patent
Aguilera et al.

(10) Patent No.: US 7,376,867 B1
(45) Date of Patent: May 20, 2008

(54) METHOD OF SEEKING CONSENSUS AMONG COMPUTER PROCESSES

(75) Inventors: Marcos Kawazoe Aguilera, Palo Alto, CA (US); Svend Frolund, Viborg (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 11/008,744

(22) Filed: Dec. 8, 2004

(51) Int. Cl.
*G06F 11/00* (2006.01)
(52) U.S. Cl. .............................. 714/21; 718/101; 718/1
(58) Field of Classification Search .................. 714/21
See application file for complete search history.

(56) References Cited

U.S. PATENT DOCUMENTS

| | | | | |
|---|---|---|---|---|
| 5,471,631 | A | * | 11/1995 | Beardsley et al. .......... 713/502 |
| 5,907,701 | A | * | 5/1999 | Hanson ...................... 718/101 |
| 6,078,930 | A | * | 6/2000 | Lee et al. ................... 707/202 |
| 6,295,541 | B1 | * | 9/2001 | Bodnar et al. .............. 707/203 |
| 6,651,242 | B1 | | 11/2003 | Hebbagodi et al. |
| 6,687,847 | B1 | | 2/2004 | Aguilera et al. |
| 6,754,845 | B2 | | 6/2004 | Kursawe et al. |
| 6,854,115 | B1 | * | 2/2005 | Traversat et al. .............. 718/1 |
| 6,898,733 | B2 | * | 5/2005 | Parks et al. .................... 714/15 |
| 2001/0056420 | A1 | * | 12/2001 | Steele et al. ..................... 707/8 |
| 2004/0015510 | A1 | * | 1/2004 | Moir et al. ................... 707/101 |

OTHER PUBLICATIONS

Aguilera et al., Strict Linearizability and the Power of Aborting, HPL-2003-241, Dec. 8, 2003, Hewlett-Packard, Palo Alto, CA.

Michael Ben-Or, Another Advantage of Free Choice: Completely Asynchronous Agreement Protocols, Proceedings of the second annual ACM symposium on Principles of distributed computing, 1983, ACM Press, New York, NY.

Chandra et al., Unreliable failure detectors for reliable distributed systems, Journal of the ACM, 1996, 43(2):225-267, ACM Press, New York, NY.

Flaviu Cristian, Understanding Fault-Tolerant Distributed Systems, 1993. <ftp://ftp.cs.ucsd.edu/pub/team/understandingftsystems.ps.Z>.

Dolev et al., On the Minimal Synchronism Needed for Distributed Consensus, Journal of the ACM, 1987, 34(1):77-97, ACM Press, New York, NY.

Dutta et al., An Efficient Universal Construction for Message-Passing Systems, (Preliminary Version), Technical Report EFPL/IC/2002/28, 2002, Swiss Federal Institute of Technology, Lausanne, Switzerland.

(Continued)

*Primary Examiner*—Christopher S McCarthy

(57) ABSTRACT

An embodiment of a method of seeking consensus among computer processes begins with a first step of saving a new timestamp in a timestamp array for a particular process. The method continues with a second step of determining whether a most recent entry in a decision array includes a previously established consensus decision. In a third step, if the most recent entry does not include the previously established consensus decision, the method saves a proposed decision as a consensus decision. Otherwise, in a fourth step, the method saves the previously established consensus decision as the consensus decision. In a fifth step, if a most recent timestamp in the timestamp array continues to be the new timestamp, the method returns the consensus decision. Otherwise, in a sixth step, the method returns an abort indicator.

25 Claims, 2 Drawing Sheets

OTHER PUBLICATIONS

Dwork et al., Consensus in the Presence of Partial Synchrony, Journal of the ACM, 1988, 35(2):288-323, ACM Press, New York, NY.

Fischer et al., Impossibility of Distributed Consensus with One Faulty Process, Journal of the ACM, 1985, 32(2):374-382, ACM Press, New York, NY.

Felix C. Gärtner, Fundamentals of Fault-Tolerant Distributed Computing Asynchronous Environments, ACM Computing Surveys, 1999, 31(1):1-26, ACM Press, New York, NY.

Maurice Herlihy, Wait-Free Synchronization, ACM Transactions on Programming Languages and Systems, 1991, 11(1):124-149, ACM Press, New York, NY.

Hurfin et al., A simple and fast asynchronous consensus protocol based on a weak failure detector, Distributed Computing, 1999, 12(4):209-223, Springer-Verlag, Berlin, Germany.

Lamport et al., The Byzantine Generals Problem, ACM Transactions on Programming Languages and Systems, 1982, 4(3):382-401, ACM Press, New York, NY.

Lamport et al., Specifying and Verifying Fault-Tolerant Systems, 1994. <http://www.research.digital.com/SRC/personal/lamport/tla/ftrtft94.ps.Z>.

Leslie Lamport, The Part-Time Parliament, ACM Transactions on Computer Systems, 1998, 16(2):133-169, ACM Press, New York, NY.

Butler W. Lampson, How to Build a Highly Available System Using Consensus, 1996. <http://www.ece.cmu.edu/~ganger/712.fall00/papers/Lampson.pdf.gz>.

Loui et al., Memory Requirements For Agreement Among Unreliable Asynchronous Processes, Advances in Computing Research, 1987, 4:163-183, JAI Press, Greenwich, CT.

André Schiper, Early consensus in an asynchronous system with a weak failure detector, Distributed computing, 1997, Springer-Verlag, Berlin, Germany.

Fred B. Schneider, Implementing Fault-Tolerant Services Using the State Machine Approach: A Tutorial, ACM Computing Surveys, 1990, 22(4):299-319, ACM Press, New York, NY.

* cited by examiner

Shared variables:

1: $ord[1, ..., n]$: single-writer multi-reader registers, initially lowTS
2: $val[1, ..., n]$: single-writer multi-reader registers, initially <lowTS, nil>

Code for each process $p_i$:

3: procedure *propose(v)*
4:    $ts \leftarrow \text{newts}(max_j\{ord[j]\})$
5:    $ord[i] \leftarrow ts$
6:    $<ts2, w> \leftarrow val[*]$ with largest $val[*].ts$
7:    if $w = nil$ then
8:      $w \leftarrow v$
9:    $val[i] \leftarrow <ts, w>$
10:   if $ts = max_j\{ord[j]\}$ then
11:      return $w$
12:   else
13:      return $\bot$

FIG. 2

METHOD OF SEEKING CONSENSUS AMONG COMPUTER PROCESSES

FIELD OF THE INVENTION

The present invention relates to the field of fault tolerant computing. More particularly, the present invention relates to the field of fault tolerant computing where there is a desire for processes to reach consensus.

BACKGROUND OF THE INVENTION

Reaching consensus is an important component of many fault tolerant distributed systems. Consensus is used to maintain consistency among redundant copies of some state in a distributed system. If there is a failure that affects a part of the distributed system, redundancy guarantees that the system can continue to operate.

Some existing techniques for reaching consensus employ message passing among processes. These techniques are based on rounds. If an invocation of the technique by a process uses an "old" round, it may fail to determine a consensus value. Some other existing techniques for reaching consensus require some degree of synchrony between processes in a distributed system. Other existing techniques use an oracle to help processes reach consensus.

Another technique for reaching consensus employs randomization in which processes have random "coins" to determine execution of the technique. This technique relies on probability to reach consensus and, with a small probability, leaves open the possibility that consensus is never achieved.

Yet another technique for reaching consensus requires that special shared-memory instructions be available. Such shared-memory instructions include load-linked instructions, store-conditional instructions, compare-and-swap instructions, or some form of read-modify-write instructions.

SUMMARY OF THE INVENTION

The present invention comprises a method of seeking consensus among computer processes. According to an embodiment, the method begins with a first step of saving a new timestamp in a timestamp array for a particular process. The method continues with a second step of determining whether a most recent entry in a decision array includes a previously established consensus decision. In a third step, if the most recent entry does not include the previously established consensus decision, the method saves a proposed decision as a consensus decision in a particular entry of the decision array for the particular process. Otherwise, in a fourth step, the method saves the previously established consensus decision as the consensus decision in the particular entry. In a fifth step, if a most recent timestamp in the timestamp array continues to be the new timestamp, the method returns the consensus decision. Otherwise, in a sixth step, the method returns an abort indicator which is outside of a set of possible consensus decisions.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 2 provides an embodiment of a method of seeking consensus of the present invention as pseudo code.

DETAILED DESCRIPTION OF A PREFERRED EMBODIMENT

Figure 1:
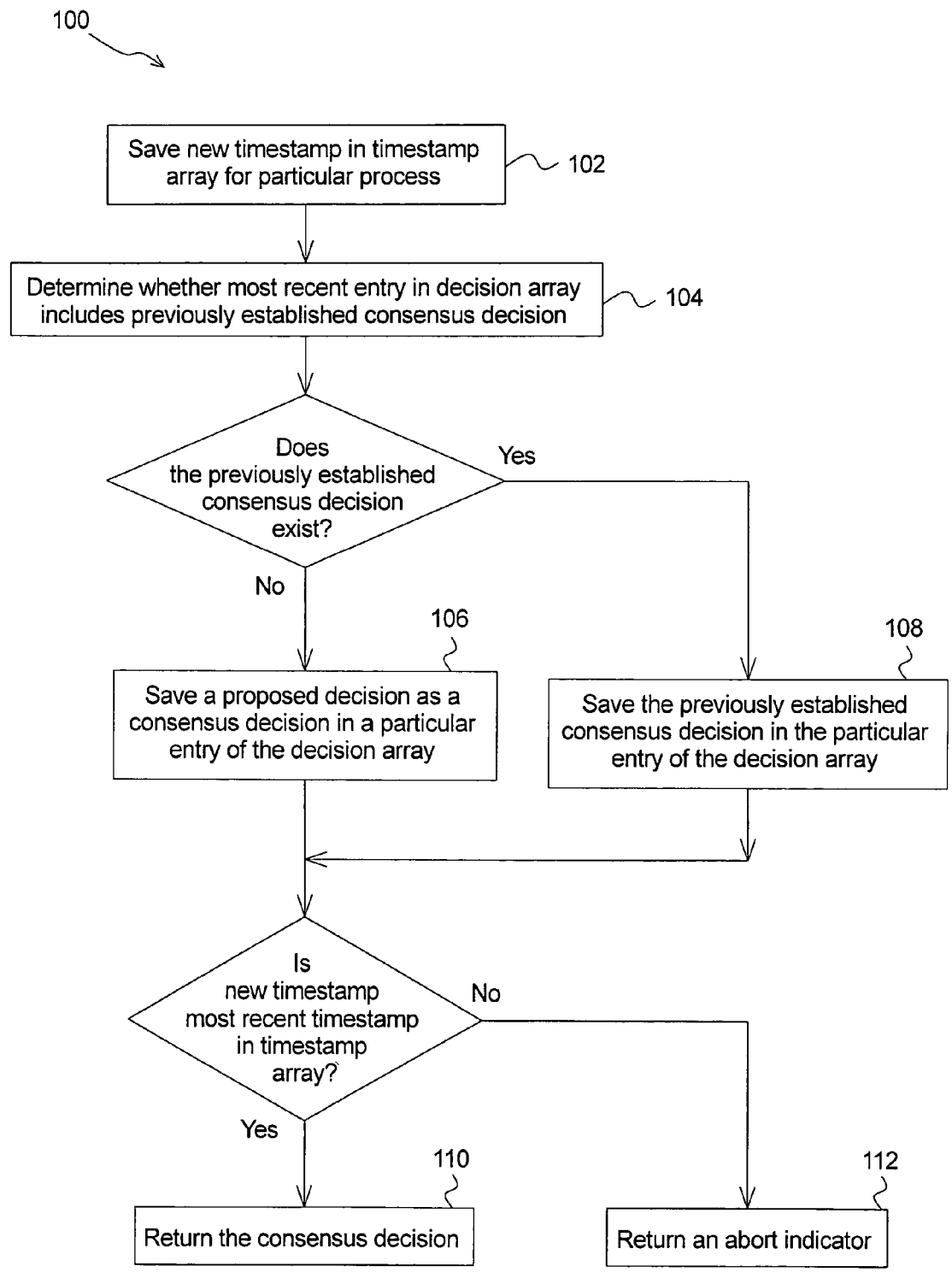
FIG. 1 illustrates an embodiment of a method of seeking consensus of the present invention as a flow chart.

The present invention comprises a method of seeking consensus among computer processes in a distributed system. The computer processes may be processes in one or more operating systems, processes in one or more machines, agents in a distributed system, or some other entities such as hosts, servers, clients, or nodes in a network. The computer processes may be subject to crash failures, which may result from power failures, operating system failures, hardware faults, or other events outside of the control of the process that fails. The present invention may be used to reach consensus among asynchronous computer processes as well as computer processes which have some degree of synchrony. An asynchronous process is a process that is not subject to timing requirements. Thus, an asynchronous process may execute arbitrarily slow or fast.

Reaching consensus among computer processes is used in the design of many fault tolerant distributed systems. Consensus maintains consistency among redundant copies of some state in a fault tolerant system. If there is a failure that affects a portion of the fault tolerant system, redundancy guarantees that the fault tolerant system continues to operate. Consensus can be used to implement any shared data structure in a fault tolerant manner. Examples of such shared data structures include shared queues, shared stacks, shared dictionaries, and shared heaps.

An embodiment of a method of seeking consensus among computer processes is illustrated as a flow chart in FIG. 1. The method 100 begins with a first step 102 of saving a new timestamp in a timestamp array for a particular process. The timestamp array includes first through nth timestamps for first through nth processes, respectively. Each timestamp has a unique value so that no two timestamps in the timestamp array have the same value. For example, the timestamp may be implemented as a counter and a process identifier. According to the example, the new timestamp may be determined from a most recent timestamp in the timestamp array prior to saving the new timestamp, adding one to its counter, and including the process identifier for the particular process.

The timestamp array comprises first through nth single-writer shared variables for the first through nth timestamps, respectively. In an embodiment, the first through nth single-writer shared variables are stored in first through nth single-writer multi-reader registers, respectively, of a shared memory. Each of the first through nth single-writer multi-reader registers is read-accessible by all of the first through nth processes. The first through nth single-writer multi-reader registers are write-accessible by the first through nth processes, respectively. In another embodiment, a message passing system implements a simulated shared memory for the first through nth single-writer shared variables.

In a second step 104, the method 100 determines whether a most recent entry in a decision array includes a previously established consensus decision. The decision array comprises first through nth entries for the first through nth computer processes, respectively. In an embodiment, each entry in the decision array includes a timestamp and a decision field. The timestamps of the first through nth entries are used to determine the most recent entry of the first through nth entries. In an embodiment, a most recent entry having a nil value in the decision field indicates that a consensus decision has not been established. According to this embodiment, if the most recent entry has a non-nil value in the decision field, the non-nil value is the previously established consensus decision.

If the most recent entry does not include the previously established consensus decision, the method 100 employs a third step 106 of saving a proposed decision as a consensus decision in a particular entry of the decision array for the particular process. Otherwise, the method 100 employs a fourth step 106 of saving the previously established consensus decision as the consensus decision in the particular entry. The consensus decision may be a value (i.e., a number). Alternatively, the consensus decision may be a series of numbers, a string, or some other decision such as a choice of true or false. In the embodiment in which each of the entries of the decision array include the timestamp, the third step 106 or the fourth step 108 also saves the new timestamp as part of the particular entry for the particular process.

The decision array comprises a second set of first through nth single-writer shared variables. In an embodiment, the second set of first through nth single-writer shared variables are stored in a second set of first through nth single-writer multi-reader registers, respectively, of a shared memory. In another embodiment, a message passing system implements a simulated shared memory for the second set of first through nth single-writer shared variables.

If a most recent timestamp in the timestamp array continues to be the new timestamp, the method 100 employs a fifth step 110 of returning the consensus decision. Otherwise, the method 100 employs a sixth step 112 of returning an abort indicator which is outside a set of possible consensus decisions. For example, the abort indicator may be a value symbolized by $\perp$, which stands for "bottom," "empty," or "false."

If the sixth step 112 returns the abort indicator, another process began an attempt to establish the consensus decision between the first step 102 of saving the new timestamp and a determination that the new timestamp is no longer a most recent timestamp in the timestamp array. Concurrency of attempts to establish the consensus decision is the only event that returns the abort indicator. Thus, the method 100 reaches the consensus if there is not a concurrent attempt between an instantiation of the first step 102 and the fifth step 110.

In an embodiment, if the abort indicator is returned, a second iteration of the method 100 is performed. If the second iteration returns the abort indicator, an exponential back-off delay may be employed in successive iterations of the method 100, which should eventually lead to reaching the consensus.

An embodiment of a method of seeking consensus among computer processes is illustrated as pseudo-code in FIG. 2. The method 200 employs an operation propose(v) that returns a consensus decision or aborts. First through nth processes share a timestamp array ord[1, ..., n] and a decision array val[1, ..., n], where an ith process $p_i$ is the writer of ord[i] and val[i], and i∈{1, ..., n}. In lines 1 and 2, the method 200 initializes the values of the timestamp array ord[1, ..., n] and the decision array val[1, ..., n].

Lines 3 through 10 provide the operation propose(v) for each process $p_i$ selected from one or more of the first through nth processes, $p_1 \ldots p_n$. In line 4, a primitive newTS(ts) provides a new timestamp ts that is higher than any of the timestamps in the timestamp array ord[1, ..., n]. In line 5, the new timestamp ts is saved in the single-writer multi-reader register ord[i]. In line 6, the most recent single-reader multi-writer register within the decision array val[1, ..., n] is determined along with the most recent decision field w. In lines 7 and 8, the proposed decision v is selected as the consensus decision if the most recent decision field w has a value of nil. Otherwise, the most recent decision field w is recognized as the consensus decision by default (i.e., the consensus decision is a previously established consensus decision). In line 9, the new timestamp and the consensus decision are written to the single-writer multi-reader register val[i]. In lines 10 and 11, if the new timestamp continues to be the most recent timestamp in the timestamp array ord[1, ..., n], the consensus decision is returned. Otherwise, in lines 12 and 13, the abort indicator $\perp$ is returned and the process $p_i$ aborts the operation propose(v). If the process $p_i$ aborts, the process $p_i$ may perform one or more additional iterations of propose(v) to reach consensus.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of seeking consensus among computer processes comprising the steps of:
   saving a new timestamp in a timestamp array for a particular process;
   determining whether a most recent entry in a decision array includes a previously established consensus decision;
   if the most recent entry does not include the previously established consensus decision, saving a proposed decision as a consensus decision in a particular entry of the decision array for the particular process;
   otherwise, saving the previously established consensus decision as the consensus decision in the particular entry; and
   if a most recent timestamp in the timestamp array continues to be the new timestamp, returning the consensus decision;
   otherwise, returning an abort indicator which is outside of a set of possible consensus decisions.

2. The method of claim 1 wherein the step of determining whether the most recent entry in the decision array includes the previously established consensus decision comprises finding the most recent entry that comprises a most recent decision array timestamp and an associated decision field, and determining whether the associated field does not include a nil value.

3. The method of claim 2 wherein, if the associated decision field does not include the nil value, the most recent entry includes the previously established consensus decision.

4. The method of claim 1 wherein the consensus decision comprises a value.

5. The method of claim 1 wherein the step of saving the proposed decision as the consensus decision further comprises saving the new timestamp in the particular entry of the decision array.

6. The method of claim 1 wherein the step of saving the previously established consensus decision as the consensus decision further comprises saving the new timestamp in the particular entry of the decision array.

7. The method of claim 1 wherein the consensus decision is used as part of a shared data structure.

8. The method of claim 7 wherein the shared data structure is selected from the group consisting of a shared queue, a shared stack, a shared dictionary, and a shared heap.

9. The method of claim 1 wherein, upon returning the abort indicator, the method further comprises performing another iteration of the steps of the method.

10. The method of claim 9 wherein, upon returning the abort indicator one or more additional times, further comprising performing one or more additional iterations of the steps of the method using an exponential back-off delay for a time for beginning the method again.

11. A method of seeking consensus among computer processes comprising the steps of:
saving a new timestamp in a timestamp array for a particular process, the timestamp array comprising first through nth timestamps for first through nth computer processes, respectively;
determining whether a most recent entry in a decision array includes a previously established consensus decision, the decision array comprising first through nth entries for the first through nth computer processes, respectively;
if the most recent entry does not include the previously established consensus decision:
saving a proposed decision as a consensus decision in a particular entry of the decision array for the particular process;
otherwise, saving the previously established consensus decision as the consensus decision in the particular entry; and
if a most recent timestamp in the timestamp array continues to be the new timestamp:
returning the consensus decision;
otherwise, returning an abort indicator which is outside of a set of possible consensus decisions.

12. The method of claim 11 wherein the first through nth processes comprise asynchronous processes.

13. The method of claim 11 wherein the first through nth computer processes are prone to crash failures.

14. The method of claim 11 wherein the first through nth computer processes are selected from a group consisting of processes in one or more operating systems, processes in one or more machines, agents in a distributed system, and entities in a network.

15. The method of claim 11 wherein the first through nth timestamps each comprise a counter and a process identifier.

16. The method of claim 15 wherein the new timestamp comprises the counter of one plus a highest counter within the timestamp array prior to saving the new timestamp and the process identifier for the particular process.

17. The method of claim 11 wherein the first through nth timestamps comprise first through nth single-writer shared variables.

18. The method of claim 17 wherein the first through nth single-writer shared variables are stored in first through nth single-writer multi-reader registers, respectively, of a shared memory.

19. The method of claim 18 wherein the first through nth processes have read access to the first through nth single-writer multi-reader registers.

20. The method of claim 18 wherein the first through nth single-writer multi-reader registers are write accessible by the first through nth processes, respectively.

21. The method of claim 17 wherein a message passing system implements a simulated shared memory for the first through nth single-writer shared variables.

22. The method of claim 11 wherein the first through nth entries of the decision array are stored in first through nth single-writer multi-reader registers, respectively, of a shared memory.

23. The method of claim 11 wherein the first through nth entries of the decision array comprise first through nth decision array timestamps and first through nth decision fields, respectively.

24. A computer readable media comprising computer code for implementing a method of seeking consensus among computer processes, the method of seeking the consensus comprising the steps of:
saving a new timestamp in a timestamp array for a particular process;
determining whether a most recent entry in a decision array includes a previously established consensus decision;
if the most recent entry does not include the previously established consensus decision, saving a proposed decision as a consensus decision in a particular entry of the decision array for the particular process;
otherwise, saving the previously established consensus decision as the consensus decision in the particular entry; and
if a most recent timestamp in the timestamp array continues to be the new timestamp, returning the consensus decision;
otherwise, returning an abort indicator which is outside of a set of possible consensus decisions.

25. A computer readable media comprising computer code for implementing a method of seeking consensus among computer processes, the method of seeking the consensus comprising the steps of:
saving a new timestamp in a timestamp array for a particular process, the timestamp array comprising first through nth timestamps for first through nth computer processes, respectively;
determining whether a most recent entry in a decision array includes a previously established consensus decision, the decision array comprising first through nth entries for the first through nth computer processes, respectively;
if the most recent entry does not include the previously established consensus decision:
saving a proposed decision as a consensus decision in a particular entry of the decision array for the particular process;
otherwise, saving the previously established consensus decision as the consensus decision in the particular entry; and
if a most recent timestamp in the timestamp array continues to be the new timestamp:
returning the consensus decision;
otherwise, returning an abort indicator which is outside of a set of possible consensus decisions.

* * * * *